Sept. 27, 1932.　　M. O. SNEDIKER　　1,879,772
TIME CONTROLLED HEAT REGULATOR
Filed Jan. 6, 1932
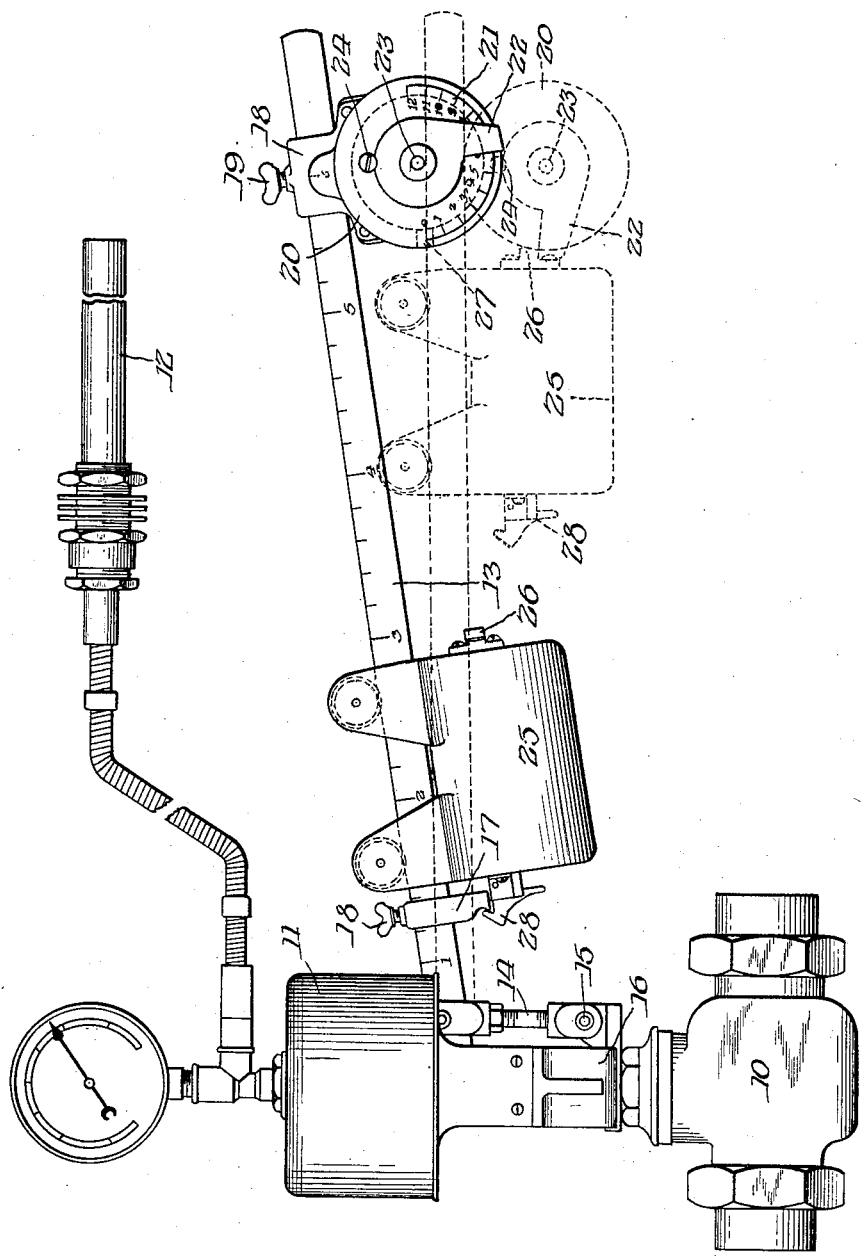
Inventor:
Morton O. Snediker.
By Murray Murray
Attys Patented Sept. 27, 1932

1,879,772

UNITED STATES PATENT OFFICE

MORTON O. SNEDIKER, OF CHICAGO, ILLINOIS, ASSIGNOR TO THE POWERS REGULATOR COMPANY, OF CHICAGO, ILLINOIS, A CORPORATION OF ILLINOIS

TIME CONTROLLED HEAT REGULATOR

Application filed January 6, 1932. Serial No. 585,041.

My invention relates to heat regulating devices and particularly to time-controlled regulation apparatus having novel features that will be hereafter pointed out.

In various commercial manufacturing operations it is desirable to provide means for insuring a definite heat treatment, that is, means whereby a batch of material may be raised to a predetermined temperature, maintained at that temperature for a definite predetermined period, and then the temperature immediately lowered or discontinued, all without reliance on the uncertainty of manual control. This operation has no relation to a process in which temperatures are raised to a certain point and maintained at that point for a certain period, then gradually raised or lowered to another point for a definite period. Clock-controlled heat regulation mechanism has been used for that purpose as demonstrated by several prior patents on that subject.

The construction under consideration here contemplates the use of extremely simple, rugged mechanism in which the action of the thermostatic motor is opposed by a lever arm carrying two, adjustable limit stops with a weight freely slidable therebetween. These stops constitute the upper and lower limits of temperature adjustment. One of the stops consists of a clock mechanism adapted for longitudinal adjustment on the arm in order to fix and maintain the upper limit of temperature regulation, means being provided for attaching the weight to the clock for a period of time equal to the desired period of high temperature regulation. When that period is completed the weight is released and allowed to freely slide to its other limit of travel, determined by the stop that is adjusted to the low temperature limit.

The invention will be more readily understood by reference to the accompanying drawing, in which the figure is an elevation of a regulating apparatus constructed in accordance with my invention.

In the drawing I have illustrated a steam valve casing 10, having a valve adapted to be moved to its seat by the expansion of a bellows contained within the casing 11, the bellows being affected by the pressure developed in the thermostatic bulb 12. These parts are all common and well known and are not illustrated in detail.

Expansion of the thermostatic bellows or motor is resisted by the arm 13 fulcrumed, through the adjustable link 14, on the pivot 15 carried as a part of the frame 16. The arm 13 is graduated or calibrated with temperature readings or otherwise as desired. A stop 17 is arranged on the arm and adapted to be held in a desired position by means of the thumb screw 18. This stop serves to fix the low temperature limit of the desired regulation. At a point near the outer end of the arm, I provide a second stop in the form of a frame 18 held in adjusted position by means of the thumb screw 19, and carrying clock mechanism indicated generally by the numeral 20. The clock dial 21 is graduated in hours and divisions thereof and under the action of the mechanism tends to rotate clockwise. An arm or pointer 22 is normally freely rotatable on a pivot 23 but is adapted to be fixed to the dial in any desired position by means of the pin 24.

A weight 25, having anti-friction rollers, is mounted for free sliding or rolling movement on the arm 13 and between the respective stops. It carries a hooked projection 26 adapted to register with a notch 27 on the rear edge of the dial at zero position. It will be understood that variations in inclination such as indicated in the dotted line position have no relation to the time controlled elements of the parts and is determined wholly by the valve position. However, the parts should be so adjusted that in a fully closed position of the valve, the arm 13 is in an upwardly inclined position, so that the weight may roll away from the clock when permitted to do so. The regulation in order to insure this result may be secured by means of the adjustable link 14.

The operation is as follows: Assuming that certain low and high temperature limits have been determined, the stops 17 and 18 are fixed on the arm in the proper positions; assuming also that a period of five and a half hours of high temperature cooking is desired. Under those circumstances the pointer 22 is moved to the point indicated in full lines in the drawing and fixed to the dial in that relation by means of the pin 24. The workman then moves the weight 25 along the arm until the hook 26 enters the notch 27. The dial with its attached pointer is then rotated clockwise into the dotted line position where the arm 22 will contact the part 26 and prevent further rotation. This sets the mechanism and with the clock in operation the temperature will be maintained at the high limit while the clock mechanism is rotating the dial in a counter-clockwise direction. When the dial reaches a point where the notch 27 is in coincidence with the hook 26 (that is, the zero position) the weight will be released and will roll downwardly into contact with the stop 17. This will serve to change the temperature to the predetermined low limit. If desired a catch 28 may be employed to retain the weight in that position against accidental displacement.

It will be understood that the foregoing description relates to a heating process, and the control described is strictly a control of an artificially increased temperature, and the valve is, therefore, closed by the thermostatic motor pressure in the bellows. If, however, the control is applied to a cooling process where an artificial decrease in temperature is produced, the valve is opened by thermostatic motor pressure instead of closed as in the illustration. Thus the arm inclination will be reversed and the position of the respective stop and clock will be reversed; otherwise, there will be no change in the mechanism.

The device is of extremely simple construction, not subject to disarrangement by vibration or hard usage and adapts itself to rather wide variations in temperature control in the matter of limits and time.

I claim:

1. In combination, a heat control valve, a frame, a thermostatic motor for regulating the position of the valve, an arm fulcrumed on the frame and cooperating with the motor, a weight freely slidable between stops on the arm and adapted to act by gravity to modify the action of the motor tending to move the valve, a clock mounted on the arm, and constituting one limit stop said clock being adapted to hold the weight in a fixed position on the arm for a predetermined interval, and means for adjusting the position of the clock relative to an extreme position of the weight to determine one temperature limit.

2. In combination, a heat control valve, a frame, a thermostatic motor for regulating the position of the valve, an arm fulcrumed on the frame and cooperating with the motor, a clock mounted on the arm and adapted for bodily adjustment longitudinally of the arm, a stop at another point on said arm, a weight freely slidable on the arm between the stop and clock and adapted to act by gravity to modify the action of the motor tending to move the valve, and means for holding the weight at the clock end of the arm for a predetermined time period and then disconnecting it to permit it to immediately travel to the opposite end of its limit of travel as defined by said stop.

3. In combination, a heat control valve, a frame, a thermostatic motor for regulating the position of the valve, an arm fulcrumed on the frame and cooperating with the motor, a clock mounted on the arm and adapted for bodily adjustment longitudinally of the arm, a stop at another point on said arm, a weight freely slidable on the arm between the stop and clock and adapted to act by gravity to modify the action of the motor tending to move the valve, and means for holding the weight at the clock end of the arm for a predetermined time period and then disconnecting it to permit it to immediately travel by gravity to the opposite end of its limit of travel as defined by said stop.

4. In combination, a heat control valve, a frame, a thermostatic motor for regulating the position of the valve, an arm fulcrumed on the frame and cooperating with the motor, a clock mounted on the arm and adapted for bodily adjustment longitudinally of the arm, a stop at another point on said arm, a weight freely slidable on the arm between the stop and clock and adapted to act by gravity to modify the action of the motor tending to move the valve, and means for holding the weight at the clock end of the arm for a predetermined time period and then disconnecting it to permit it to immediately travel by gravity to the opposite end of its limit of travel as defined by said stop, the arm being arranged to lie in a position downwardly inclined from the clock in all relations of the parts.

5. In combination, a heat control valve, a thermostatic motor for regulating the position of the valve, an arm cooperating with the motor, a clock mounted on the arm and acting as a high temperature limit stop, said clock being adjustable bodily longitudinally of the arm, a low temperature limit stop also longitudinally adjustable of the arm, a weight movable by gravity between said stops and adapted to act by gravity to modify the action of the motor tending to move the valve, and means for holding said weight against the clock until disconnected by motion of a time-controlled element of the clock, the position of said arm being at all times such that when disconnected from the clock the weight will travel by gravity to its opposite limit of movement.

In testimony whereof I have affixed my signature.

MORTON O. SNEDIKER.